United States Patent
Guo et al.

(10) Patent No.: US 12,253,911 B2
(45) Date of Patent: Mar. 18, 2025

(54) PROGRAMMABLE AND HIGH-PERFORMANCE DATA SCRAMBLER FOR NON-VOLATILE MEMORY CONTROLLERS

(71) Applicant: Intel Corporation, Santa Clara, CA (US)

(72) Inventors: Xin Guo, San Jose, CA (US); Ravi Motwani, Fremont, CA (US); Donia Sebastian, Fair Oaks, CA (US); Aaron Lutzker, Walnut Creek, CA (US)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 17/534,944

(22) Filed: Nov. 24, 2021

(65) Prior Publication Data

US 2022/0083419 A1   Mar. 17, 2022

(51) Int. Cl.
| | | |
|---|---|---|
| G06F 11/10 | (2006.01) | |
| G06F 3/06 | (2006.01) | |
| G06F 7/58 | (2006.01) | |
| G06F 11/07 | (2006.01) | |

(52) U.S. Cl.
CPC ........ G06F 11/1068 (2013.01); G06F 3/0619 (2013.01); G06F 3/0623 (2013.01); G06F 3/0659 (2013.01); G06F 3/0679 (2013.01); G06F 7/588 (2013.01); G06F 11/0772 (2013.01)

(58) Field of Classification Search
CPC ............ G06F 11/1068; G06F 11/0772; G06F 3/0619; G06F 3/0659; G06F 3/0679; G06F 3/0623; G06F 7/588
See application file for complete search history.

(56) References Cited

U.S. PATENT DOCUMENTS

| | | | | |
|---|---|---|---|---|
| 8,261,159 B1* | 9/2012 | Sommer | ............. | G06F 11/1048 713/193 |
| 2009/0323942 A1* | 12/2009 | Sharon | ............... | G11C 16/3427 380/28 |
| 2010/0070681 A1* | 3/2010 | Wan | .................... | G06F 12/0246 711/E12.008 |
| 2012/0163605 A1* | 6/2012 | Sharon | ................ | G11C 11/5628 380/287 |
| 2016/0283320 A1* | 9/2016 | Motwani | ............. | G06F 11/1012 |
| 2020/0293696 A1* | 9/2020 | Motwani | ............... | H04L 9/0631 |
| 2021/0326490 A1* | 10/2021 | Zalivaka | ............. | G06F 11/1068 |
| 2022/0253224 A1* | 8/2022 | Khayat | ............... | G06F 9/30029 |

OTHER PUBLICATIONS

Wikipedia, "Disaggregated Storage", <en.wikipedia.org/wiki/Diaggregated_storage>, retrieved Nov. 11, 2021, 3 pages.

* cited by examiner

*Primary Examiner* — Samir W Rizk
(74) *Attorney, Agent, or Firm* — Jordan IP Law, LLC

(57) ABSTRACT

Systems, apparatuses and methods may provide for technology that generates a first set of scrambler bits based on a destination page number associated with data, generates a second set of scrambler bits based on a programmable nonlinear function, and combines the first set of scrambler bits and the second set of scrambler bits into a scrambler seed. In one example, the technology also randomizes the data based on the scrambler seed to obtain outgoing randomized data and writes the outgoing randomized data to a non-volatile memory.

20 Claims, 5 Drawing Sheets

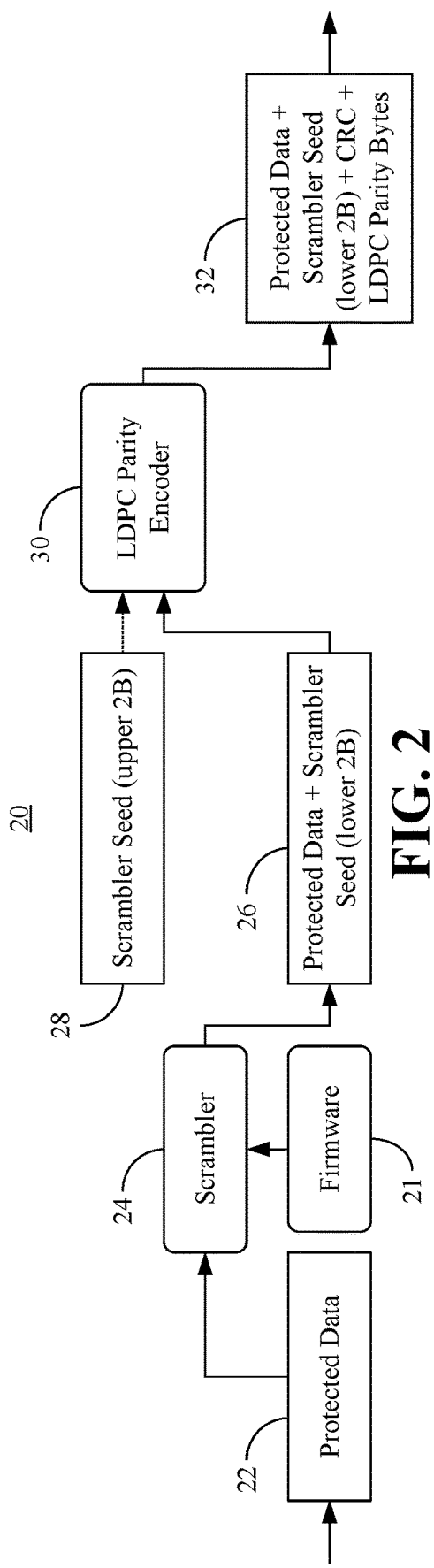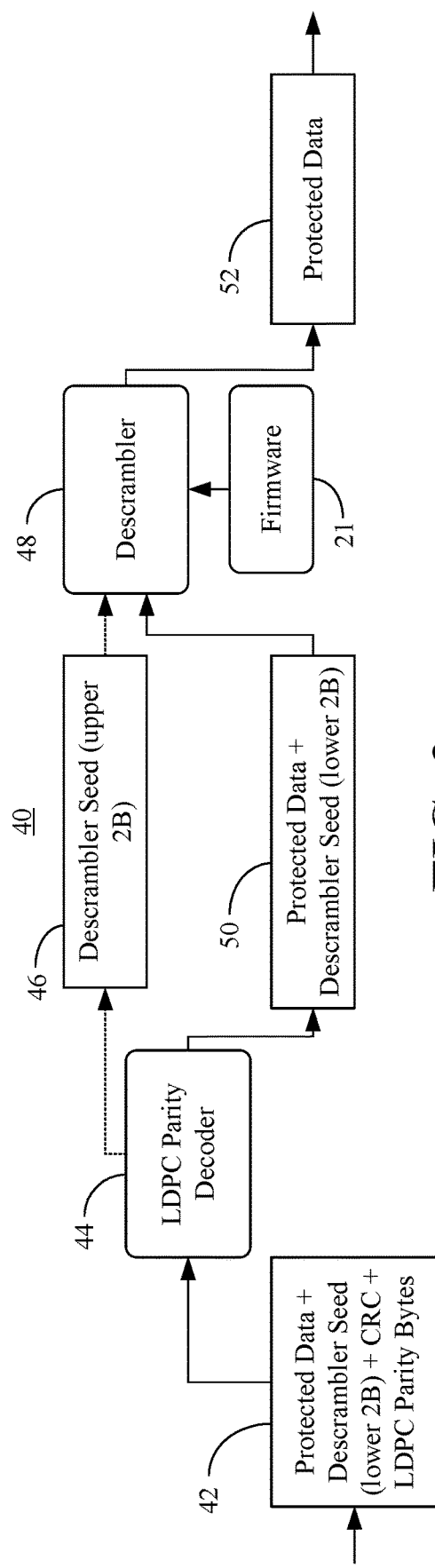

PROGRAMMABLE AND HIGH-PERFORMANCE DATA SCRAMBLER FOR NON-VOLATILE MEMORY CONTROLLERS

TECHNICAL FIELD

Embodiments generally relate to memory structures. More particularly, embodiments relate to programmable and high-performance data scramblers for non-volatile memory (NVM) controllers.

BACKGROUND

NAND flash memory devices are a type of NVM typically having a close cell-to-cell proximity that may result in capacitive coupling between memory cells. This capacitive coupling may in turn cause cell-to-cell interference. A randomized data pattern in data being written to the NAND flash memory device may minimize the impact of cell-to-cell interference. User data, however, is often predictably non-random. The random pattern may be realized by transforming (e.g., via a data scrambler residing in either the NAND onboard circuitry or a NAND solid state drive/SSD controller) the incoming user data before the data is written to the NAND media.

A typical data scrambler may conduct an exclusive OR (XOR) operation between the user data and the output of a linear shift feedback register (LFSR) having an initial value (e.g., seed) that is either fixed or programmable. A fixed seed may produce suboptimal results across different types of NAND flash memory devices (e.g., floating-gate flash memory versus charge-trap flash memory), whereas a programmable seed may increase system overhead (e.g., due to seed calculation) and reduce the amount of storage available (e.g., due to storage of the programmable seed).

BRIEF DESCRIPTION OF THE DRAWINGS

The various advantages of the embodiments will become apparent to one skilled in the art by reading the following specification and appended claims, and by referencing the following drawings, in which:

FIG. 2 is a block diagram of an example of a write data path to media according to an embodiment;

FIG. 3 is a block diagram of an example of a read data path from media according to an embodiment;

DESCRIPTION OF EMBODIMENTS

Figure 1:
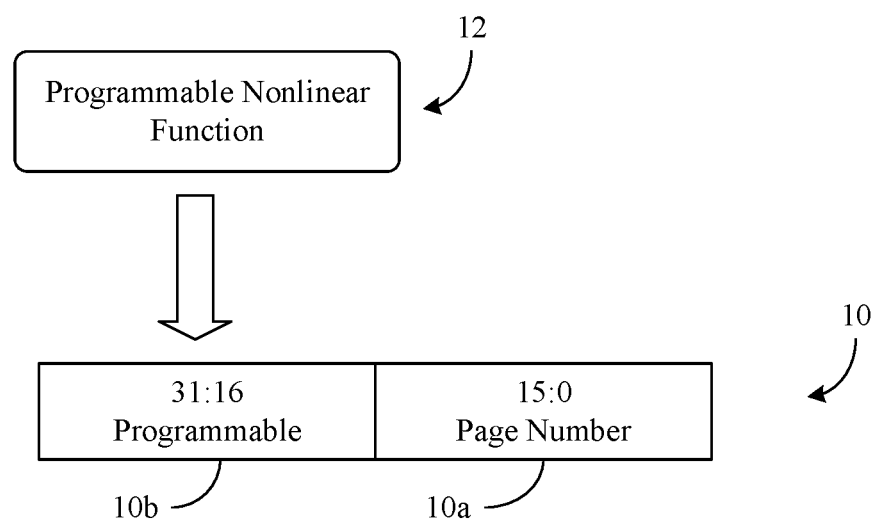
FIG. 1 is an illustration of an example of a scrambler seed according to an embodiment.

FIG. 1 shows a scrambler seed 10 (10a, 10b) that includes a first set of scrambler bits 10a (e.g., lower 2 Bytes (B)) and a second set of scrambler bits 10b (e.g., upper 2B). The first set of scrambler bits 10a may be automatically generated by a controller and/or firmware (FW) based on the physical location (e.g., destination page number) in non-volatile memory (NVM, e.g., NAND flash memory) where user data is to be programmed. Thus, the first set of scrambler bits 10a is known to the controller at the time of the read/program operation. The second set of scrambler bits 10b are generated based on a programmable nonlinear function 12. The inputs to the programmable nonlinear function 12, as well as the function 12 itself, may be selected based on the type of NVM (e.g., floating-gate flash, charge-trap flash, tri-level cell/TLC, quad-level cell/QLC, penta-level cell/PLC). For example, the inputs to the programmable nonlinear function 12 might be the destination page number and the codeword number (e.g., low density parity check/LDPC codeword number).

As will be discussed in greater detail, the scrambler seed 10 may be used as an initial value for a linear feedback shift register (LFSR), wherein the output of the LSFR is XORed with the user data to randomize the user data. Combining the first set of scrambler bits 10a and the second set of scrambler bits 10b into the scrambler seed 10 provides optimal flexibility and randomization capability for high performance data scramblers used in enterprise SSDs. Moreover, the enhanced statistical randomness provided by the scrambler seed 10 produces better results than previous, inflexible, purely hardware implemented solutions.

The ability to detect an error scenario in which firmware specifies a different seed for a descrambling operation than the seed 10 used for the scrambling operation is highly valuable for debug purposes. A sub-optimal option to detecting an incorrect descrambler seed might be to store the scrambler seed 10 in the media and compare the stored scrambler seed 10 with the firmware-provided seed for descrambling. Such an approach, however, would consume additional bytes in the media and reduce the number of LDPC parity bytes.

Embodiments detect an incorrect descrambler seed without storing all four bytes of the scrambler seed 10 in media. Rather, "shortening" technology is used, wherein all or part of the scrambler seed bytes are included along with the protected data in the computation of LDPC parity bytes, only a subset of the scrambler seed bytes are stored in the media along with the protected data. When the data is later read from the media, the "shortened" scrambler seed bytes are regenerated during the LDPC parity correction process. The regenerated scrambler seed bytes are then compared with firmware provided scrambler seed bytes to detect a seed mismatch prior to the descrambling operation.

Extension of the shortening scheme to encompass protecting any data that is available during the decoding operation is possible. A useful extension would be to ensure that when the read from NAND is issued, the read indeed occurs from the intended address. Since the physical address is known both during write and read, the physical address can be part of the information on which the LDPC parity is generated. The physical address is not stored in the media because it is available during the read operation. Shortening of the physical address and comparing it with the regenerated address post successful LDPC decode ensures that the read was indeed from the intended address. For example, if the read occurs from the wrong physical address, the LDPC decoding will flip the physical address input during decode to the physical address from which the read occurred. A comparison of the decoded physical address and the issued physical address can be performed post decode. If the decoded physical address and the issued physical address do not check out, a physical address fail flag can be returned by the LDPC decoder. For certain cases such as a power loss incident, a write to NAND programmed to $2^n$ levels (n>1) may be directed to the SLC (single-level cell) NAND. A read from the SLC NAND will always result in the physical address fail flag to be set. To overcome these false detects, a provision to override the physical address fail flag being low can be provided.

FIG. 2 shows a write data path 20 in which firmware 21 provides a 4B scrambler seed such as, for example, the scrambler seed 10 (FIG. 1), to a scrambler 24. In the illustrated example, only the lower 2B of the 4B scrambler seed are stored in the media and the upper 2B of scrambler seed are shortened, to achieve scrambler seed mismatch capability on all four bytes of the scrambler seed. More particularly, protected data 22 is input to the scrambler 24, which uses a scrambler seed such as, for example, the scrambler seed 10 (FIG. 1) as an input to an LFSR and conducts an XOR operation between the protected data 22 and the output of the LFSR to obtain randomized protected data. Thus, an output 26 of the scrambler 24 includes the randomized protected data and the lower 2B of the scrambler seed. The output 26 and the upper 2B 28 of the scrambler seed are input to an LDPC parity encoder 30. In an embodiment, an output 32 of the LDPC parity encoder 30 includes the randomized protected data, the lower 2B of the scrambler seed, cyclical redundancy check (CRC) data, and LDPC parity bytes. In an embodiment, the output 32 is written to the NVM. Of particular note is that the output 32 does not include the upper 2B 28 of the scrambler seed.

FIG. 3 shows a read data path 40 in which an input 42 is read from NVM and provided to an LDPC parity decoder 44. The illustrated input 42 includes randomized protected data, the lower 2B of a descrambler seed, CRC data, and LDPC bytes. In one example, the LDPC parity decoder 44 generates an upper 2B 46 of the descrambler seed and sends the upper 2B 46 to a descrambler 48. Additionally, the LDPC parity decoder 44 may send an output 50 to the descrambler 48, wherein the output 50 includes the randomized protected data and the lower 2B of the descrambler seed. In an embodiment, the firmware 21 provides the scrambler seed 10 (FIG. 1) to the descrambler 48, which compares the descrambler seed to the scrambler seed and generates an error notification if the descrambler seed does not match the scrambler seed. If the descrambler seed matches the scrambler seed, the descrambler 48 uses the descrambler seed as an input to an LFSR and conducts an XOR operation between the randomized protected data and the output of the LFSR to obtain protected data 52.

Figure 4:
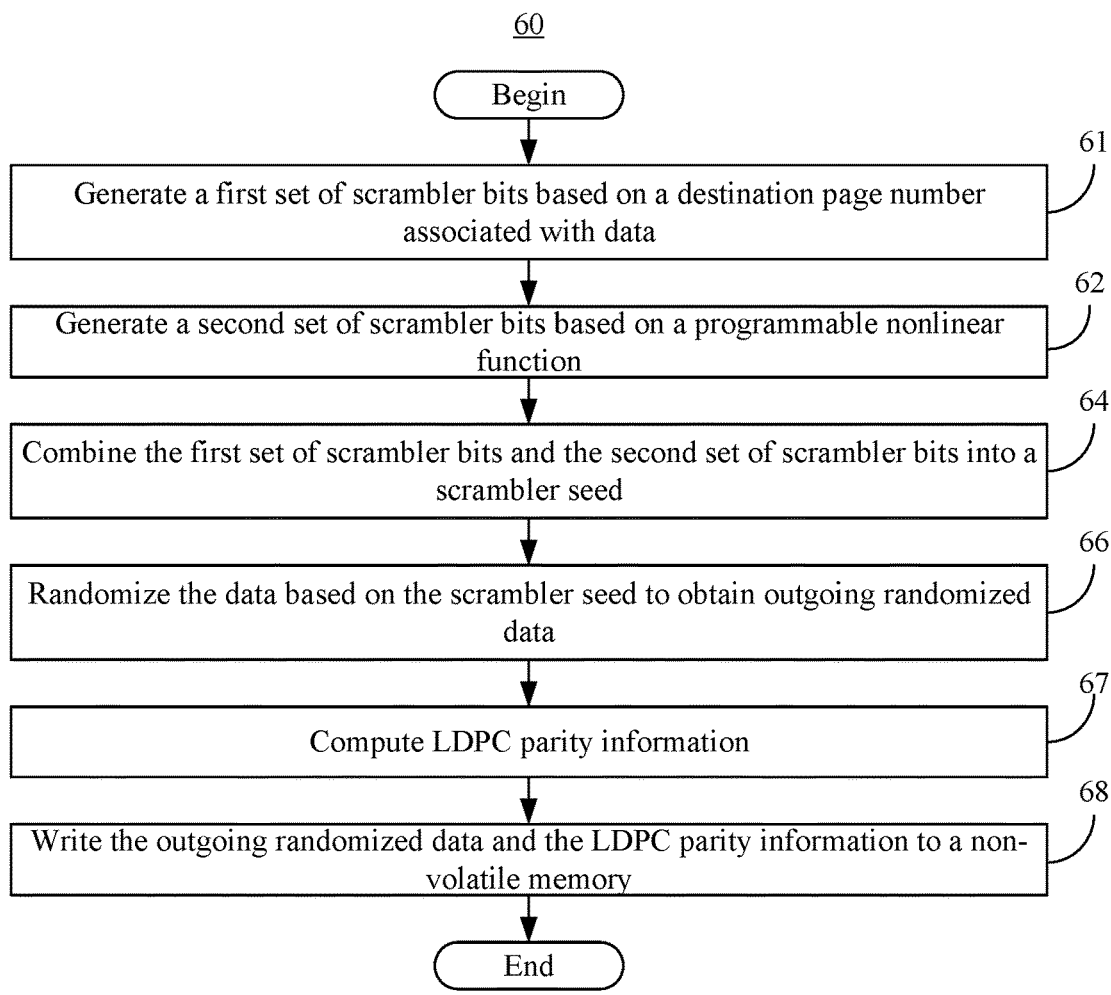
FIG. 4 is a flowchart of an example of a method of writing data to an NVM according to an embodiment.

FIG. 4 shows a method 60 of writing data to an NVM such as, for example, a NAND flash memory device. The method 60 may generally be implemented in NAND onboard circuitry, a NAND solid SSD controller, etc. More particularly, the method 60 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 61 provides for generating a first set of scrambler bits (e.g., lower 2B) based on a destination page number associated with data (e.g., non-random user data). Block 62 generates a second set of scrambler bits (e.g., upper 2B) based on a programmable nonlinear function (e.g., having flexible inputs). Additionally, block 64 combines the first set of scrambler bits with the second set of scrambler bits into a scrambler seed. In an embodiment, block 66 randomizes the data based on the scrambler seed to obtain outgoing randomized data. For example, block 66 might use the scrambler seed as an initial value of an LFSR and XOR the data with the output of the LFSR. Block 67 may provide for computing LDPC parity information. In addition, block 68 writes the outgoing randomized data and the LDPC parity information to an NVM (e.g., at the destination page number). The method 60 therefore enhances performance and/or reliability at least to the extent that combining programmable nonlinear function bits with physical location bits into a scrambler seed provides optimal flexibility and randomization capability for high performance data scramblers. The enhanced statistical randomness produces better results than previous, inflexible, purely hardware implemented solutions.

Figure 5:
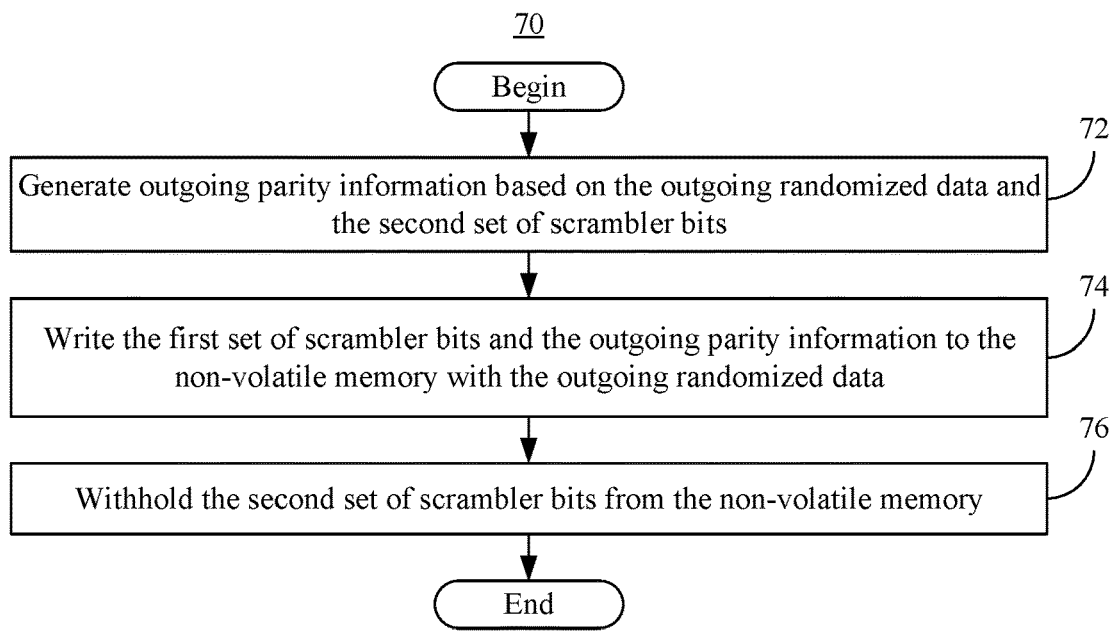
FIG. 5 is a flowchart of an example of a method of shortening a scrambler seed according to an embodiment.

FIG. 5 shows a method 70 of shortening a scrambler seed. The method 70 may generally be conducted in conjunction with the method 60 (FIG. 4), already discussed. More particularly, the method 70 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 72 provides for generating outgoing parity information (e.g., LDPC parity bytes, CRC information) based on the outgoing randomized data and the second set of scrambler bits. In an embodiment, block 74 writes the first set of scrambler bits and the outgoing parity information to the NVM with the outgoing randomized data. Additionally, block 76 withholds the second set of scrambler bits from the NVM. The method 70 therefore further enhances performance and/or reliability by freeing up additional bytes in the media and increasing the number of available LDPC parity bytes.

Figure 6:
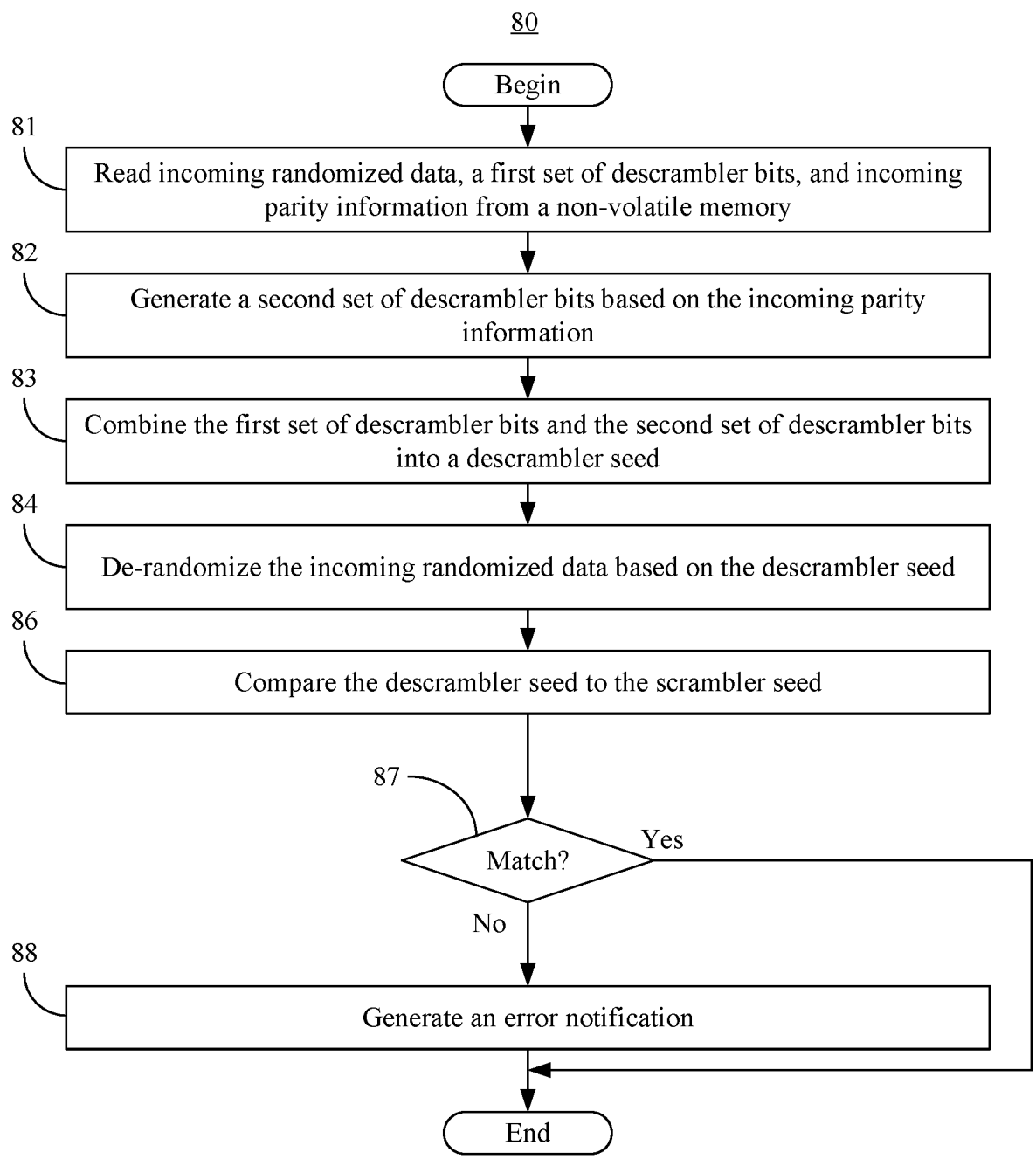
FIG. 6 is a flowchart of an example of a method of reading data from an NVM according to an embodiment.

FIG. 6 shows a method 80 of reading data from an NVM. The method 80 may generally be implemented in NAND onboard circuitry, a NAND solid SSD controller, etc. More particularly, the method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 81 provides for reading incoming randomized data, a first set of descrambler bits, and incoming parity information (e.g., LDPC parity bytes, CRC information) from an NVM. Block 82 generates a second set of descrambler bits based on the incoming parity information, wherein block 83 combines the first set of descrambler bits and the second set of descrambler bits into a descrambler seed. In an embodiment, block 84 de-randomizes the incoming randomized data based on the descrambler seed. For example, block 84 might use the descrambler seed as an initial value of an LFSR and XOR the incoming randomized data with the output of the LFSR. Additionally, block 86 may compare the descrambler seed with the scrambler seed. If it is determined at block 87 that the descrambler seed does not match the scrambler seed, block 88 generates an error notification. Otherwise, the method 80 bypasses block 88 and terminates. Block 84 may alternatively be implemented after block 87 (e.g., only if the descrambler seed matches the scrambler seed). The method 80 therefore further enhances performance by supporting robust debug operations.

Figure 7:
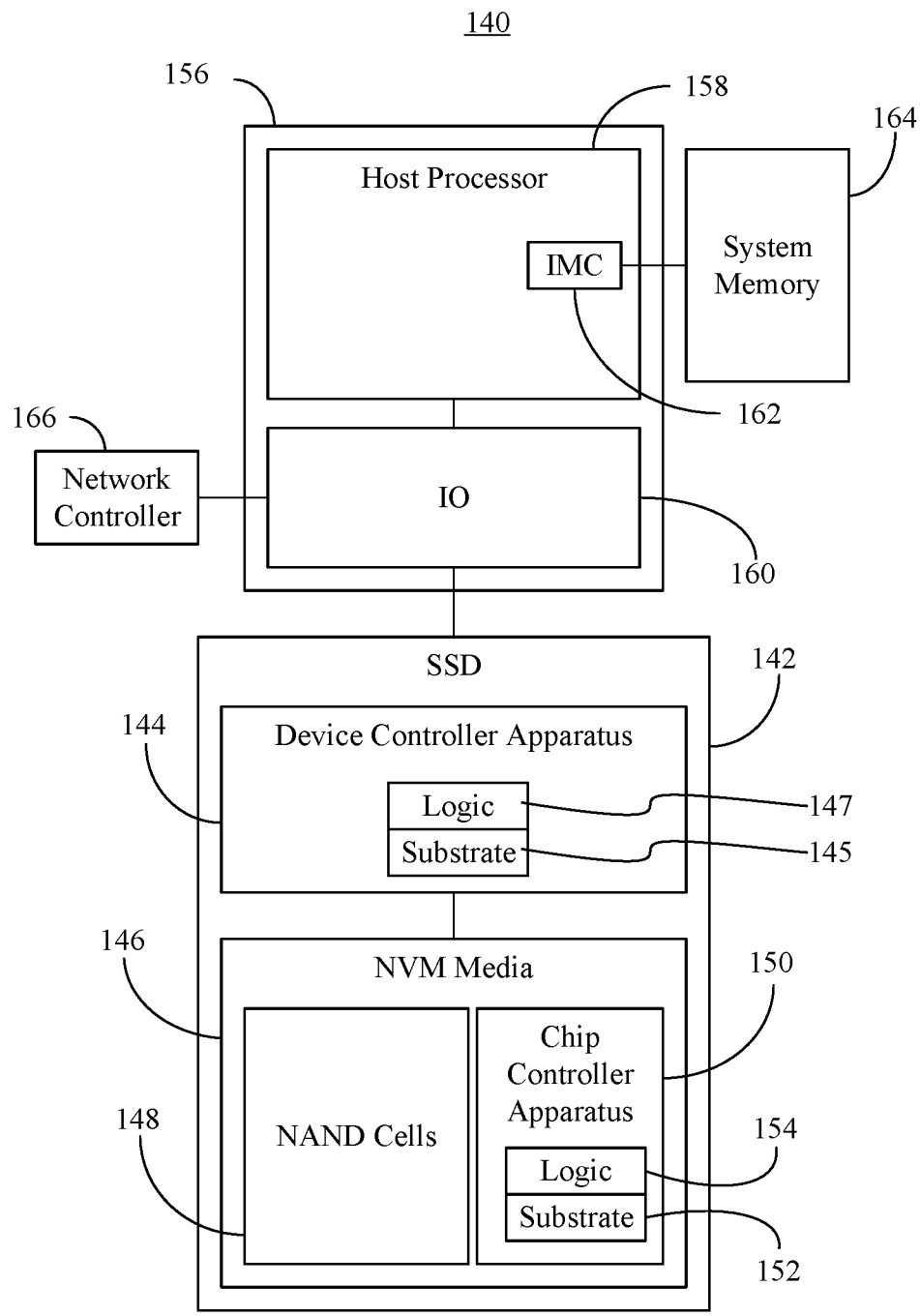
FIG. 7 is a block diagram of an example of a reliability-enhanced computing system according to an embodiment.

Turning now to FIG. 7, a computing system 140 is shown. In the illustrated example, a reliability-enhanced SSD 142 includes a device controller apparatus 144, and a NVM media 146 having a set of NAND cells 148 and a chip controller apparatus 150 that includes a substrate 152 (e.g., silicon, sapphire, gallium arsenide) and logic 154 (e.g., transistor array and other integrated circuit/IC components) coupled to the substrate 152. Similarly, the device controller apparatus 144 may also include a substrate 145 and logic 147 coupled to the substrate 145. In some embodiments, the NAND cells 148 include a transistor-less stackable cross point architecture (e.g., 3D Xpoint, referred to as INTEL OPTANE) in which the NAND cells 148 (e.g., sitting at the intersection of word lines and bit lines) are distributed across a plurality of storage dies and are individually addressable. In such a case, bit storage may be based on a change in bulk resistance. In an embodiment, the device controller apparatus 144 and the chip controller apparatus 150 are two parts of the same ASIC. The logic 154 and/or the logic 147, which may include one or more of configurable or fixed-functionality hardware, may be configured to perform one or more aspects of the method 60 (FIG. 4), the method 70 (FIG. 5) and/or the method 80 (FIG. 6), already discussed.

Thus, the logic 154 and/or the logic 147 generates a first set of scrambler bits based on a destination page number associated with data, generates a second set of scrambler bits based on a programmable nonlinear function, and combines the first set of scrambler bits and the second set of scrambler bits into a scrambler seed. The computing system 140 is therefore reliability enhanced at least to the extent that combining programmable nonlinear function bits with physical location bits into a scrambler seed provides optimal flexibility and randomization capability for high performance data scramblers. The enhanced statistical randomness produces better results than previous, inflexible, purely hardware implemented solutions. The illustrated system 140 also includes a system on chip (SoC) 156 having a host processor 158 (e.g., central processing unit/CPU) and an input/output (IO) module 160. The host processor 158 may include an integrated memory controller 162 (IMC) that communicates with system memory 164 (e.g., RAM dual inline memory modules/DIMMs). The illustrated IO module 160 is coupled to the SSD 142 as well as other system components such as a network controller 166.

In one example, the logic 154 and the logic 147 include transistor channel regions that are positioned (e.g., embedded) within the substrates 152, 145, respectively. Thus, the interface between the logic 154 and the substrate 152—and between the logic 147 and the substrate 145—may not be an abrupt junction. The logic 154, 147 may also be considered to include an epitaxial layer that is grown on an initial wafer of the substrates 152, 145, respectively. The computing system 140 may be part of a server, desktop computer, notebook computer, tablet computer, convertible tablet, smart television (TV), personal digital assistant (PDA), mobile Internet device (MID), smart phone, wearable device, media player, vehicle, robot, Internet of Things (IoT) device, drone, autonomous vehicle, datacenter storage network, cloud storage, etc., or any combination thereof.

ADDITIONAL NOTES AND EXAMPLES

Example 1 includes a semiconductor apparatus comprising one or more substrates and logic coupled to the one or more substrates, wherein the logic is implemented at least partly in one or more of configurable or fixed-functionality hardware, the logic to generate a first set of scrambler bits based on a destination page number associated with data, generate a second set of scrambler bits based on a programmable nonlinear function, and combine the first set of scrambler bits and the second set of scrambler bits into a scrambler seed.

Example 2 includes the semiconductor apparatus of Example 1, wherein the logic is further to randomize the data based on the scrambler seed to obtain outgoing randomized data, and write the outgoing randomized data to a non-volatile memory.

Example 3 includes the semiconductor apparatus of Example 2, wherein the logic is further to generate outgoing parity information based on the outgoing randomized data and the second set of scrambler bits, write the first set of scrambler bits and the outgoing parity information to the non-volatile memory with the outgoing randomized data, and withhold the second set of scrambler bits from the non-volatile memory.

Example 4 includes the semiconductor apparatus of any one of Examples 2 to 3, wherein the logic is further to read incoming randomized data, a first set of descrambler bits, and incoming parity information from the non-volatile memory, generate a second set of descrambler bits based on the incoming parity information, and combine the first set of descrambler bits and the second set of descrambler bits into a descrambler seed.

Example 5 includes the semiconductor apparatus of Example 4, wherein the logic is further to compare the descrambler seed to the scrambler seed, generate an error notification if the descrambler seed does not match the scrambler seed, and de-randomize the incoming randomized data based on the descrambler seed if the descrambler seed matches the scrambler seed.

Example 6 includes a reliability-enhanced computing system comprising a non-volatile memory, and a controller coupled to the non-volatile memory, wherein the controller includes logic implemented at least partly in one or more of configurable or fixed-functionality hardware, the logic to generate a first set of scrambler bits based on a destination page number associated with data, generate a second set of scrambler bits based on a programmable nonlinear function, and combine the first set of scrambler bits and the second set of scrambler bits into a scrambler seed.

Example 7 includes the computing system of Example 6, wherein the logic is further to randomize the data based on the scrambler seed to obtain outgoing randomized data, and write the outgoing randomized data to the non-volatile memory.

Example 8 includes the computing system of Example 7, wherein the logic is further to generate outgoing parity information based on the outgoing randomized data and the second set of scrambler bits, write the first set of scrambler bits and the outgoing parity information to the non-volatile memory with the outgoing randomized data, and withhold the second set of scrambler bits from the non-volatile memory.

Example 9 includes the computing system of any one of Examples 7 to 8, wherein the logic is further to read incoming randomized data, a first set of descrambler bits, and incoming parity information from the non-volatile memory, generate a second set of descrambler bits based on the incoming parity information, and combine the first set of descrambler bits and the second set of descrambler bits into a descrambler seed.

Example 10 includes the computing system of Example 9, wherein the logic is further to compare the descrambler seed to the scrambler seed, generate an error notification if the descrambler seed does not match the scrambler seed, and de-randomize the incoming randomized data based on the descrambler seed if the descrambler seed matches the scrambler seed.

Example 11 includes at least one computer readable storage medium comprising a set of instructions, which when executed by a computing system, cause the computing system to generate a first set of scrambler bits based on a destination page number associated with data, generate a second set of scrambler bits based on a programmable nonlinear function, and combine the first set of scrambler bits and the second set of scrambler bits into a scrambler seed.

Example 12 includes the at least one computer readable storage medium of Example 11, wherein the instructions, when executed, further cause the computing system to randomize the data based on the scrambler seed to obtain outgoing randomized data, and write the outgoing randomized data to a non-volatile memory.

Example 13 includes the at least one computer readable storage medium of Example 12, wherein the instructions, when executed, further cause the computing system to generate outgoing parity information based on the outgoing randomized data and the second set of scrambler bits, write the first set of scrambler bits and the outgoing parity information to the non-volatile memory with the outgoing randomized data, and withhold the second set of scrambler bits from the non-volatile memory.

Example 14 includes the at least one computer readable storage medium of any one of Examples 12 to 13, wherein the instructions, when executed, further cause the computing system to read incoming randomized data, a first set of descrambler bits, and incoming parity information from the non-volatile memory, generate a second set of descrambler bits based on the incoming parity information, and combine the first set of descrambler bits and the second set of descrambler bits into a descrambler seed.

Example 15 includes the at least one computer readable storage medium of Example 14, wherein the instructions, when executed, further cause the computing system to compare the descrambler seed to the scrambler seed, generate an error notification if the descrambler seed does not match the scrambler seed, and de-randomize the incoming randomized data based on the descrambler seed if the descrambler seed matches the scrambler seed.

Example 16 includes a method of operating a reliability-enhanced computing system, the method comprising generating a first set of scrambler bits based on a destination page number associated with data, generating a second set of scrambler bits based on a programmable nonlinear function, and combining the first set of scrambler bits and the second set of scrambler bits into a scrambler seed.

Example 17 includes the method of Example 16, further including randomizing the data based on the scrambler seed to obtain outgoing randomized data, and writing the outgoing randomized data to a non-volatile memory.

Example 18 includes the method of Example 17, further including generating outgoing parity information based on the outgoing randomized data and the second set of scrambler bits, writing the first set of scrambler bits and the outgoing parity information to the non-volatile memory with the outgoing randomized data, and withholding the second set of scrambler bits from the non-volatile memory.

Example 19 includes the method of any one of Examples 17 to 18, further including reading incoming randomized data, a first set of descrambler bits, and incoming parity information from the non-volatile memory, generating a second set of descrambler bits based on the incoming parity information, and combining the first set of descrambler bits and the second set of descrambler bits into a descrambler seed.

Example 20 includes the method of Example 19, further including comparing the descrambler seed to the scrambler seed, generating an error notification if the descrambler seed does not match the scrambler seed, and de-randomizing the incoming randomized data based on the descrambler seed if the descrambler seed matches the scrambler seed.

Example 21 includes an apparatus comprising means for performing the method of any one of Examples 16 to 20.

Technology described herein may therefore provide a flexible yet robust scrambler design that can be used for current and future flash devices with optimal data randomization performance to help the SSD products achieve better reliability (e.g., by eliminating possible reliability issues caused by non-ideal data randomization algorithms). The technology satisfies all constraints by providing enough flexibility in the seed choice to allow for NAND specific tuning on a wide range of NAND types, while also reducing the amount of scrambler seed bits required to make space for on the NAND. Thus, the technology guarantees that each location receives a different scrambler sequence, further protecting against silent data errors.

The technology described herein also provides a scheme by which scrambler seed errors (e.g., where a different seed is specified for descrambling than the seed used for scrambling) can be detected without actually storing the scrambler seed in the media. This detection is accomplished by including the scrambler seed in the LDPC parity computation of the scrambled data when writing to the media, but then not storing the scrambler seed bytes in the media. When reading the data media, the LDPC engine regenerates the shortened scrambler seed bytes and these bytes are compared against the scrambler seed provided by firmware to check for seed errors.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus comprising:
   one or more substrates; and
   logic coupled to the one or more substrates, wherein the logic is implemented at least partly in one or more of configurable or fixed-functionality hardware, the logic to:
   generate a first set of scrambler bits based on a destination page number associated with data;
   generate a second set of scrambler bits based on a programmable nonlinear function; and
   combine the first set of scrambler bits and the second set of scrambler bits into a scrambler seed, wherein the scrambler seed is a single scrambler seed.

2. The semiconductor apparatus of claim 1, wherein the logic is further to:
   randomize the data based on the scrambler seed to obtain outgoing randomized data; and
   write the outgoing randomized data to a non-volatile memory.

3. The semiconductor apparatus of claim 2, wherein the logic is further to:
   generate outgoing parity information based on the outgoing randomized data and the second set of scrambler bits;
   write the first set of scrambler bits and the outgoing parity information to the non-volatile memory with the outgoing randomized data; and
   withhold the second set of scrambler bits from the non-volatile memory.

4. The semiconductor apparatus of claim 2, wherein the logic is further to:
   read incoming randomized data, a first set of descrambler bits, and incoming parity information from the non-volatile memory;
   generate a second set of descrambler bits based on the incoming parity information; and
   combine the first set of descrambler bits and the second set of descrambler bits into a descrambler seed.

5. The semiconductor apparatus of claim 4, wherein the logic is further to:
   compare the descrambler seed to the scrambler seed;
   generate an error notification if the descrambler seed does not match the scrambler seed; and
   de-randomize the incoming randomized data based on the descrambler seed if the descrambler seed matches the scrambler seed.

6. A computing system comprising:
   a non-volatile memory; and
   a controller coupled to the non-volatile memory, wherein the controller includes logic implemented at least partly in one or more of configurable or fixed-functionality hardware, the logic to:
   generate a first set of scrambler bits based on a destination page number associated with data,
   generate a second set of scrambler bits based on a programmable nonlinear function, and
   combine the first set of scrambler bits and the second set of scrambler bits into a scrambler seed, wherein the scrambler seed is a single scrambler seed.

7. The computing system of claim 6, wherein the logic is further to:
   randomize the data based on the scrambler seed to obtain outgoing randomized data, and
   write the outgoing randomized data to the non-volatile memory.

8. The computing system of claim 7, wherein the logic is further to:
   generate outgoing parity information based on the outgoing randomized data and the second set of scrambler bits,
   write the first set of scrambler bits and the outgoing parity information to the non-volatile memory with the outgoing randomized data, and withhold the second set of scrambler bits from the non-volatile memory.

9. The computing system of claim 7, wherein the logic is further to:
read incoming randomized data, a first set of descrambler bits, and incoming parity information from the non-volatile memory,
generate a second set of descrambler bits based on the incoming parity information, and
combine the first set of descrambler bits and the second set of descrambler bits into a descrambler seed.

10. The computing system of claim 9, wherein the logic is further to:
compare the descrambler seed to the scrambler seed,
generate an error notification if the descrambler seed does not match the scrambler seed, and
de-randomize the incoming randomized data based on the descrambler seed if the descrambler seed matches the scrambler seed.

11. At least one non-transitory computer readable storage medium comprising a set of instructions, which when executed by a computing system, cause the computing system to:
generate a first set of scrambler bits based on a destination page number associated with data;
generate a second set of scrambler bits based on a programmable nonlinear function; and
combine the first set of scrambler bits and the second set of scrambler bits into a scrambler seed, wherein the scrambler seed is a single scrambler seed.

12. The at least one non-transitory computer readable storage medium of claim 11, wherein the instructions, when executed, further cause the computing system to:
randomize the data based on the scrambler seed to obtain outgoing randomized data; and
write the outgoing randomized data to a non-volatile memory.

13. The at least one non-transitory computer readable storage medium of claim 12, wherein the instructions, when executed, further cause the computing system to:
generate outgoing parity information based on the outgoing randomized data and the second set of scrambler bits;
write the first set of scrambler bits and the outgoing parity information to the non-volatile memory with the outgoing randomized data; and
withhold the second set of scrambler bits from the non-volatile memory.

14. The at least one non-transitory computer readable storage medium of claim 12, wherein the instructions, when executed, further cause the computing system to:
read incoming randomized data, a first set of descrambler bits, and incoming parity information from the non-volatile memory;
generate a second set of descrambler bits based on the incoming parity information; and
combine the first set of descrambler bits and the second set of descrambler bits into a descrambler seed.

15. The at least one non-transitory computer readable storage medium of claim 14, wherein the instructions, when executed, further cause the computing system to:
compare the descrambler seed to the scrambler seed;
generate an error notification if the descrambler seed does not match the scrambler seed; and
de-randomize the incoming randomized data based on the descrambler seed if the descrambler seed matches the scrambler seed.

16. A method comprising:
generating a first set of scrambler bits based on a destination page number associated with data;
generating a second set of scrambler bits based on a programmable nonlinear function; and
combining the first set of scrambler bits and the second set of scrambler bits into a scrambler seed, wherein the scrambler seed is a single scrambler seed.

17. The method of claim 16, further including:
randomizing the data based on the scrambler seed to obtain outgoing randomized data; and
writing the outgoing randomized data to a non-volatile memory.

18. The method of claim 17, further including:
generating outgoing parity information based on the outgoing randomized data and the second set of scrambler bits;
writing the first set of scrambler bits and the outgoing parity information to the non-volatile memory with the outgoing randomized data; and
withholding the second set of scrambler bits from the non-volatile memory.

19. The method of claim 17, further including:
reading incoming randomized data, a first set of descrambler bits, and incoming parity information from the non-volatile memory;
generating a second set of descrambler bits based on the incoming parity information; and
combining the first set of descrambler bits and the second set of descrambler bits into a descrambler seed.

20. The method of claim 19, further including:
comparing the descrambler seed to the scrambler seed;
generating an error notification if the descrambler seed does not match the scrambler seed; and
de-randomizing the incoming randomized data based on the descrambler seed if the descrambler seed matches the scrambler seed.

* * * * *